Sept. 10, 1929.  H. F. BORK  1,728,098
HITCH
Filed Jan. 4, 1929
*Fig.1.*
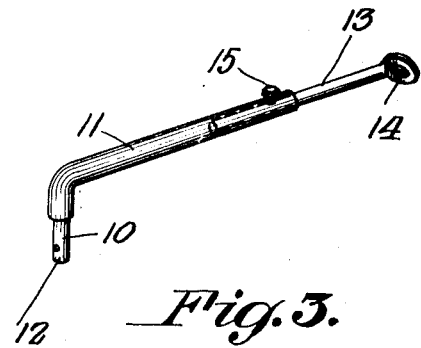
*Fig.3.*
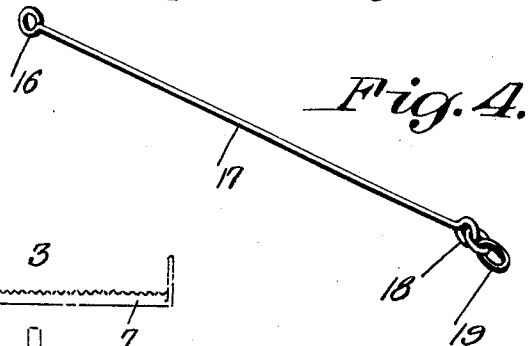
*Fig.4.*
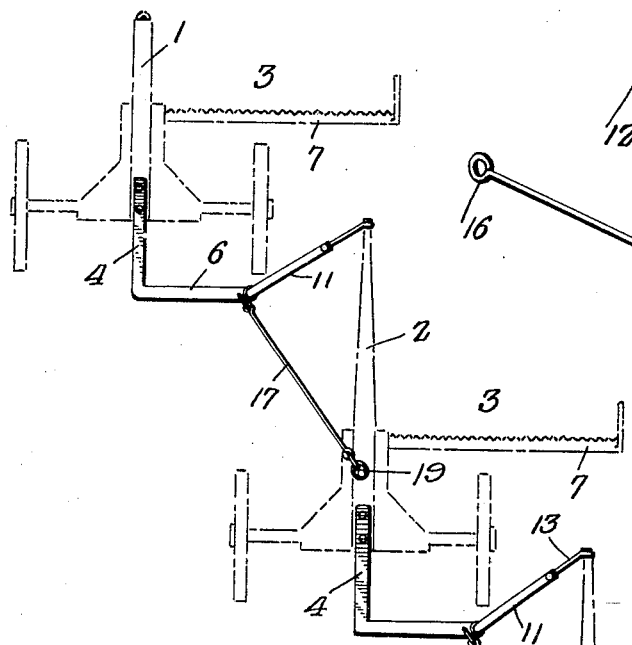
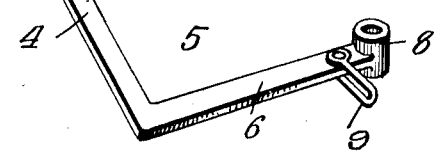
*Fig.2.*
Herman F. Bork,
INVENTOR
BY Victor J. Evans
ATTORNEY Patented Sept. 10, 1929.

1,728,098

UNITED STATES PATENT OFFICE.

HERMAN F. BORK, OF OKATON, SOUTH DAKOTA.

HITCH.

Application filed January 4, 1929. Serial No. 330,220.

The object of this, my present invention, is the provision of a hitch for connecting a plurality of mowing machines to arrange the same one to the rear and at the side of the others, whereby the cutter of each machine will individually perform its function so that a wide swath may be cut as the machines are moved over the field.

A further object is the provision of a hitch for this purpose which may be easily and quickly attached to or removed from the mowing machines and which will connect the several machines in a manner to prevent side draft but which will not interfere with all of the machines freely traveling over and cutting a field.

A further object is the provision of a hitch for this purpose that shall be of an extremely simple construction, cheaply manufactured, readily attached and which will perform its function with ease and with accuracy.

To the attainment of the foregoing the invention consists in the improvement hereinafter described and definitely claimed.

In the drawings:

Figure 1 is a plan view illustrating diagrammatically a plurality of mowing machines connected together by my improved hitch.

Figure 2 is a perspective view of the right angle member of the hitch.

Figure 3 is a similar view of the telescopic brace.

Figure 4 is a similar view of the brace rod.

While in Figure 1 of the drawings I have illustrated my improvement connecting three mowing machines it will be obvious that a greater number of mowing machines may be attached and it is to be understood that the traction power is attached to the front machine. The front machine preferably has its tongue 1 of a less length than the tongues 2 of the remaining or rear machines. As is ordinary the tongues extend over the body portion of the machines 3, and to each tongue, at the rear thereof, I bolt the arm 4 of a right angle member 5. The second arm 6 of each of the right angle members 5 is directed toward one side of the machine and is in parallelism with the cutter 7 of the said machine. The arms 6 have their outer ends merging into sockets 8 and inward of the sockets there is pivoted to each of the said arms 6 a link 9.

Designed to be received in the sockets 8 of the respective hitch elements 5 there is the reduced downwardly extending end 10 of a hollow and preferably tubular member 11. A cotter pin passes through a suitable opening 12 in the end 10 of each member 11. Received in each of the tubular members 11 there is a rod 13 that has its outer end formed with an angle eye 14 to be attached to the outer end of the tongues 2 of the rear mowing machines. A binding element 15 is screwed through each of the tubular members 11 for holding the telescopic elements 13 adjusted therein. Each of the telescopic brace members is forwardly disposed and is angularly arranged with respect to the hitch members 5.

Secured to the links 9 of the right angle hitch members or plates 5 there are the eye ends 16 of rods 17. The second end of each of the rods 17 is also provided with an eye 18 to which is attached the links of a short chain 19, and these chains are designed to be attached by means 20 to the tongues 2. The brace rods 17 are rearwardly directed and, of course, angularly disposed with respect to the right angle hitch elements 5. With my improvement it will be noted that a plurality of mowing machines may be arranged one to the rear of the other and connected in a manner whereby the outer ends of the cutters of the forward machine are disposed approximately in a line with the inner ends of the cutters of the rear machines so that a wide swath may be cut when the machines are caused to travel over the field. It will be further noted that the hitch prevents any side draft of the mowing machines but does not interfere with the vertical movement thereof or in any ways retard the machines in their travel over the field.

Having described the invention, I claim:

A hitch for connecting a plurality of mowing machines to arrange the outer ends of the cutters of the forward machines approximately in a line with the inner ends of the cutters of the rear machines, comprising a right angle plate having one of its arms fixed to the rear of a mowing machine and its second arm extending in the direction of and in a plane with that of the cutter of the mowing machine, said last mentioned arm having a socket end, and a link pivoted inward of the said socket, a removable telescopic brace having an angle end which is received through the socket, means for holding the sections of the telescopic brace adjustable, an angle eye on the outer section of each brace to engage with the tongue of a mowing machine, a rod loosely connected with the link, and chain sections on the second end of the rod designed to be removably connected to the tongue of the second mowing machine.

In testimony whereof I affix my signature.

HERMAN F. BORK.